(12) United States Patent
Kelly

(10) Patent No.: US 6,465,107 B1
(45) Date of Patent: Oct. 15, 2002

(54) SILICONE-CONTAINING POLYOLEFIN FILM

(75) Inventor: Peter Yates Kelly, Township of Storrington (CA)

(73) Assignee: DuPont Canada Inc., Mississauga (CA)

( * ) Notice: Subject to any disclaimer, the term of this patent is extended or adjusted under 35 U.S.C. 154(b) by 0 days.

(21) Appl. No.: 09/671,275

(22) Filed: Sep. 28, 2000

Related U.S. Application Data

(63) Continuation-in-part of application No. 09/042,546, filed on Mar. 17, 1998, now abandoned, which is a continuation-in-part of application No. 08/926,221, filed on Sep. 9, 1997, now abandoned.

(60) Provisional application No. 60/025,251, filed on Sep. 13, 1996.

(51) Int. Cl.$^7$ .............................. B32B 9/04; C08L 83/10

(52) U.S. Cl. ..................... 428/447; 428/334; 428/335; 428/336; 427/387; 427/532; 427/535; 427/536; 525/100; 525/105; 525/106; 156/329

(58) Field of Search ................................. 525/100, 105, 525/106; 428/335, 334, 336, 447; 427/387, 532, 535, 536; 156/329

(56) References Cited

U.S. PATENT DOCUMENTS

| | | | |
|---|---|---|---|
| 3,264,272 A | * 8/1966 | Rees | |
| 3,565,750 A | 2/1971 | Evans | 161/208 |
| 4,351,931 A | 9/1982 | Armitage | 526/227 |
| 4,446,090 A | 5/1984 | Lovgren et al. | 264/211 |
| 4,806,594 A | 2/1989 | Gross et al. | 525/64 |
| 4,978,436 A | 12/1990 | Kelly | 204/165 |
| 5,028,674 A | 7/1991 | Hatch et al. | 526/216 |
| 5,169,900 A | 12/1992 | Gudelis | 525/106 |
| 5,476,901 A | 12/1995 | Smith et al. | 525/100 |
| 5,488,087 A | * 1/1996 | Cabasso et al. | 525/100 |
| 5,708,084 A | 1/1998 | Hauenstein et a. | 525/102 |
| 5,708,085 A | 1/1998 | Hauenstein et al. | 525/106 |

FOREIGN PATENT DOCUMENTS

| | | |
|---|---|---|
| EP | 0484093 | 3/1996 |
| JP | 08302305 | 3/1996 |
| WO | WO96/21567 | 7/1996 |
| WO | WO97/00665 | 1/1997 |

OTHER PUBLICATIONS

Derwent Abstract of JP 05039423 A, Feb. 1993, assigned to Tokuyama Soda.*
Machine translation of JP–05–039423, Hidecki et al., Feb. 1993.*

* cited by examiner

Primary Examiner—Robert Dawson
Assistant Examiner—Jeffrey B. Robertson
(74) Attorney, Agent, or Firm—Dimock Stratton Clarizio LLP; Dino P. Clarizio

(57) ABSTRACT

A silicone-containing resin, film and film on a subweb are described. The resin and film are formed from (i) polyolefin, (ii) dimethyl polysiloxane having functional end-groups, (iii) vinyl silane compound, and (iv) ultra-high molecular weight silicone polymer optionally using (v) an organoperoxide agent and (vi) an organo-metallic moisture curing agent. Resins consisting essentially of (a) functionalized polyolefins; (b) dimethyl polysiloxanes having functional end-groups to react with said functionalized polyolefins; (c) ultra-high molecular weight silicone and optional organometallic moisture curing agent and films or multilayer structures made therefrom are also described. The film is suitable for use in release films and in liquid-absorbing products.

30 Claims, No Drawings

SILICONE-CONTAINING POLYOLEFIN FILM

CROSS-REFERENCE TO RELATED APPLICATIONS

This application is a continuation-in-part of U.S. patent application Ser. No. 09/042,546, filed Mar. 17, 1998, now abandoned, which is a continuation-in-part of U.S. patent application Ser. No. 08/926,221 filed Sep. 9, 1997, now abandoned which claims priority from U.S. Provisional Application No. 60/025,251, filed Sep. 13, 1996.

FIELD OF THE INVENTION

The present invention relates to resins for films or coatings having release or peelability characteristics and modified surface tension properties, which makes them suitable for use in release films such as those used to protect adhesive films. It especially relates to so-called release films formed from polyolefin, a polysiloxane, a vinyl silane, and an ultra-high molecular weight silicone polymer.

The invention relates particularly to a multi-layer film comprising the release films formed from polyolefin, a polysiloxane, a vinyl silane, and an ultra-high molecular weight silicone polymer as a layer and a polyolefin forming another layer. The release film of this invention can also be adhered to or coated onto a subweb of paper, aluminum, plastics such as nylon and polyester, or other subwebs suitable for coating. The multi-layer film can be used in liquid-absorbing products, such as feminine hygiene pads, baby diapers and incontinence products.

BACKGROUND OF THE INVENTION

Films containing a polyolefin, a polysiloxane, an organo-peroxide agent and a vinyl silane are known from U.S. Pat. Nos. 4,978,436 and 5,169,900, both incorporated herein by reference. Such films are useful for their slip, release, peelability or related characteristics, making them suitable for use as peelable coatings on adhesive materials, as removable protective layers for substrates, and as slip layers used in high-speed coating and packaging apparatuses. The patents suggest a nominal film thickness of 25 microns and a gauge uniformity for such films of 25 to 30 microns.

While these films perform their functions well, they have the disadvantage of being expensive, particularly in comparison with films made entirely of polyolefin. It has now been found that a thin film, one with thickness of about 1 to about 10 microns, can be made to perform the function of the much thicker films.

In the field of feminine hygiene pads, baby diapers, incontinence products and the like, perforated polyolefin films have long been used as a topsheet. These topsheets typically have tapered capillaries of critical diameters and tapers with a base in the plane of the topsheet and an apex remote from the plane and in contact with an absorbent element. U.S. Pat. No. 3,929,135, incorporated herein by reference, describes such topsheets. The patent discusses the product's ability to allow passage of fluid through the topsheet (away from the user) to the absorbent material, while preventing backflow from the absorbent material to the user.

The most commonly used polyolefin employed in such topsheets is low density polyethylene, which is ideal from a liquid wicking standpoint. With its relatively high surface tension (about 32 dynes/centimeter), liquid drainage through the topsheet is good. On the other hand, as a result of the high surface tension, certain discharge products such as menstrual fluids and feces adhere somewhat to the surface of the film, soiling the surface in contact with the user and occluding perforations with a resultant reduction in fluid transfer.

It has now been found that polyolefin film having a thin surface layer or coating of polysiloxane, with a surface tension of about 23 dynes/centimeter, can provide superior performance in these applications. While the lower surface tension would be expected to cause reduced liquid flow (that is, fluid drainage normally decreases with decreases in surface tension), it has been found that the polysiloxane-coated polyolefin has improved soiling resistance and generally allows for more rapid transfer of liquid through the topsheet to the absorbent material.

SUMMARY OF THE INVENTION

The present invention provides a silicone-containing polyolefin resin that in film-form has superior uniformity and efficacy at surprisingly low thickness. This film or resin precursor comprises (i) a polyolefin, (ii) a dimethyl polysiloxane having functional end-groups, (iii) at least one vinyl silane compound, and (iv) ultra-high molecular weight silicone polymer. In another aspect, the resin formulation consists essentially of (a) a functionalized polyolefin copolymer in combination with (b) a dimethyl polysiloxane having functional end-groups which covalently reacts with said copolymer and (c) an ultra-high molecular weight silicone polymer. The present invention also comprises film made therefrom. Additionally, the film made from components (i)–(iv) is preferably formed using an organic peroxide and an organo-metallic moisture curing agent, the organic peroxide preferably being at a level that not all the vinyl silane grafts to the polyolefin. The film made from components (a)–(c) additionally may have a moisture curing agent. The invention provides a multi-layer structure comprising (a) a subweb layer, preferably a polyolefin, and (b) a surface layer of the silicone-containing polyolefin film of this invention placed, preferably by coextrusion, on the subweb, the surface layer being a film having a thickness of about 1 to about 10 microns. The silicone-containing polyolefin film preferably is surface treated, for example by corona discharge, to improve its release properties.

The present invention further encompasses the use of the films herein described as release layers, and, when the subweb is a polyolefin, in the aforementioned absorbent products.

DETAILED DESCRIPTION OF THE INVENTION

As used herein, the following terms have the meanings given below.

"Polyolefin", whether used in layer (A) or layer (3) of the film of the present invention, means homopolymers and copolymers of unsaturated hydrocarbons having 2–20 carbon atoms ("unfunctionalized") or as defined alternatively below ("functionalized"). They can be made by processes well known in the art, including metallocene processes. In particular, the polymers are homopolymers of ethylene or propylene or copolymers of ethylene with one or more alpha-olefin hydrocarbons having 3–10 carbon atoms, especially propylene, butene-1, hexene-1 and octene-1 and styrene. Suitable alpha-olefins also include dienes, that is, monomers with more than 1 site of unsaturation, especially 1,3 butadiene, 1,5 hexadiene and norbornadiene. In particularly preferred embodiments, the Polyolefins are copolymers of ethylene with a hydrocarbon alpha-olefin having from 4–8 carbon atoms and having a density in the range of about 0.850 to about 0.970 grams per cubic centimeter (g/cm$^3$) and especially in the range of 0.920 to 0.930 g/cm$^3$. Preferably, the polymers have a melt index (MI) in the range of 0.05 to 120 dg/min, especially 0.1 to 75 dg/min and in particular 1 to 10 dg/min. (as measured per ASTM D-1238, condition E).

Mixtures and blends of the Polyolefins may be used. In general, the polymers are of the type that may be extruded in the form of film.

The Polyolefin may contain additives, for example antioxidants and other stabilizers, anti-block and slip agents and the like. The Polyolefin may also contain fillers, e.g., talc, mica, calcium carbonate, and the like and/or pigments such as titanium dioxide. In addition, the Polyolefin may contain modifying polymers, e.g., rubber-like modifying polymers such as ethylene/propylene/diene, styrene butadiene styrene, and other elastomers. It is to be understood that any additive must not cause undue adverse effects on the release and/or surface tension properties of the film.

In alternative embodiments, direct copolymers or blends of copolymers of ethylene and a polar monomer, e.g., α,β-ethylenically-unsaturated $C_3$–$C_8$ carboxylic acid ("ethylene-acid copolymers"), or ester thereof, or an ethylenically unsaturated ester of a carboxylic acid may be employed as the Polyolefins or may be blended with the Polyolefins. By "direct copolymer", it is meant that the copolymer is made by polymerization of monomers together at the same time, as distinct from a "graft copolymer" where a monomer is attached or polymerized onto an existing polymer chain. Preparation of the direct ethylene-acid copolymers is described in U.S. Pat. No. 4,351,931.

The ethylene-acid copolymers can be E/X/Y copolymers where E is ethylene; X is a modifying comonomer and Y is the α,β-ethylenically-unsaturated $C_3$–$C_8$ carboxylic acid, particularly acrylic or methacrylic acid, or ester thereof. Preferably, however, the ethylene-acid copolymer is a dipolymer (no modifying comonomer). The preferred acid moieties are methacrylic acid and acrylic acid. Suitable modifing comonomers (X) are selected from alkyl acrylate and alkyl methacrylate, the alkyl groups having from 1–12 carbon atoms, which, when present, may be up to 30 (preferably up to 25, most preferably up to 15) wt. % of the ethylene-acid copolymer. X may also be vinyl acetate or carbon monoxide.

A wide range of percent acid moiety in the ethylene-acid copolymer may be used. The acid moiety may be present in a range of about 1 to 30 weight percent of the acid copolymer, preferably in a range of about 5 to 25, alternatively about 10 to about 20. The ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 or by employing somewhat higher pressures than those at which copolymers with lower acid can be prepared.

Examples of such copolymers include ethylene/acrylic acid copolymers, ethylene/methacrylic acid copolymers, ethylene/itaconic acid copolymers, ethylene/alkyl acrylate copolymers and ethylene/alkyl methacrylate copolymers especially where the alkyl group is methyl, ethyl, propyl or butyl, ethylene/vinyl silane copolymers and ethylene/vinyl acetate copolymers.

Specific other copolymers include ethylene/alkyl acrylate/acrylic acid, ethylene/alkyl acrylate/methacrylic acid, ethylene/alkyl acrylate/maleic anhydride, and ethylene/alkyl methacrylate/maleic anhydride, wherein the alkyl group can have 1–10 carbon atoms, preferably n-butyl, iso butyl, or methyl, ethylene/vinyl acetate/methacrylic acid, ethylene/vinyl acetate/maleic anhydride, ethylenelvinyl acetate/carbon monoxide, ethylene/alkyl acrylate/carbon monoxide, ethylene/alkyl methacrylate/carbon monoxide, ethylene/carbon monoxide/acrylic acid, ethylene/vinyl tri-alkoxy silane, ethylene/vinyl acetate/tri-alkoxy silane, ethylene/alkyl acrylate/vinyl tri-alkoxy silane, ethylene/vinyl acetate/glycidyl methacrylate, ethylene/glycidyl methacrylate, ethylene/alkyl acrylate/glycidyl methacrylate and ethylene/alkyl methacrylate/glycidyl methacrylate where the alkyl or alkoxy group can have 1–10 carbon atoms.

In the alternate embodiments, ionomeric copolymers may be employed as the Polyolefins or may be blended therewith. These ionomers are derived from direct copolymers of ethylene with acid containing monomers and ethylene-acid copolymers by neutralization with metal ions. Methods of preparing such ionomers are well known and are described in U.S. Pat. No. 3,264,272. The ethylene-acid copolymers are partially neutralized (15 to 75 percent) with metal cations, particularly monovalent and/or bivalent metal cations. Preferably about 25 to about 60 of the acid is neutralized. Preferred metal cations include lithium, sodium, and zinc, or a combination of such cations. Zinc is most preferred.

Further, graft copolymers or blends of graft copolymers of polyolefins may be used as the Polyolefin, either by themselves or blended with the Polyolefins, ethylene/polar-monomer direct copolymers, or inomeric copolymers. These graft copolymers are made by means well known in the art with one or more graft monomers. The graft monomers can be selected from the group consisting of ethylenically unsaturated acidic monomers and their derivatives including acrylic acid, methacrylic acid, maleic acid, fumaric acid, itaconic acid, crotonic acid, 5-norbomene-2,3-dicarboxylic acid, maleic anhydride, monosodium maleate, disodium maleate, itaconic anhydride, citraconic anhydride, monomethyl fumarate and monomethyl maleate. Also, the graft monomers can be selected from ethylenically unsaturated monomers containing amino or hydroxy functional groups including vinyl pyridines, vinyl silanes, 4-vinyl pyridine, vinyltriethoxysilane, and hydroxy ethyl methacrylate. The graft monomers can also include styrene and glycidyl methacrylate. The grafting monomers, and mixtures thereof, can be present in the graft polymer in an amount of about 0.05 to about 5 weight percent. Preferred polyolefins for grafting include polyethylene, polypropylene, ethylene propylene diene terpolymer and copolymers of ethylene with vinyl acetate, carbon monoxide, or ethylenically unsaturated carboxylic acids or esters thereof.

"Polysiloxane" means a dimethyl polysiloxane having functional end groups. The preferred functional end group is a hydroxyl group. Such dimethyl polysiloxanes are commercially available, for example as silanol-terminated dimethyl polysiloxane from Hüils America Inc., U.S.A. under the trade name OHEB. However, dimethyl polysiloxanes having other terminal groups that are reactable with vinyl silanes, especially when grafted onto polyolefins, may be used, e.g., polysiloxanes with amine, epoxy, methoxy groups or the like. In addition, the Polysiloxane may be a moisture-crosslinkable polysiloxane, in which event the amount of vinyl silane used in the manufacture of the release film may be lowered. In preferred embodiments, the dimethyl polysiloxane is of the formula:

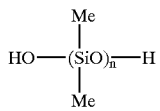

where Me =methyl and n is the range of 200 to 2,300.

"Organic Peroxides", which serve as grafting agents in the present invention, are known in the art and include di-ertiary alkyl peroxides, especially dicumyl peroxide, which is available under the trade name LUPEROX® 500, and 2,5-dimethyl-2,5-i(t-butylperoxy) hexane, or Lupersol® 101. Other organic peroxides include acetylenic diperoxy compounds especially 2,5-dmethyl-2,5-di(t-butylperoxy) hexyne-3, which is available under the trade names LUPERSOL® 130,. Other organic peroxides include peroxyesters, preferably t-amyl peroxypivalate and t-butyl peroxypivalate, peroxydicarbonates, preferably di (sec-butyl) peroxydicarbonate, and acylperoxides, preferably dibenzoyl peroxide. The grafting agent serves to graft a portion of the vinyl silane onto the polyolefin. Absence of grafted vinyl silane may adversely affect properties of the films, especially the processability of the compositions that form the films.

"Vinyl Silane Compounds" are known in the art and include vinyl trimethoxy silane, vinyl triethoxy silane, vinyl triacetoxy silane, trisbutanoxime vinyl silane, divinyl tetramethoxy disiloxane, hexamethyl bisdimethylaminoxy cyclotetrasiloxane and the like. Mixtures of such silanes may be used.

"Organo-metallic Moisture Curing Agents" are known in the art, and for use in the present invention, will typically be organo-tin or organo-titanium compounds. The preferred cross-linking agent is dibutyl tin dilaurate.

Compositions containing vinyl silane, organic peroxide and cross-linking agent are available under the trade name SILCAT®R, which is believed to contain vinyl trimethoxy silane, dicumyl peroxide and dibutyl tin dilaurate.

"UHMW Silicone Polymer" means an ultrahigh molecular weight silicone polymer with a number average molecular weight range from about 350,000 to about 1 million. UHMW Silicone Polymer suitable for use in the present invention may be non-reactive, i.e. comprise no fimctionalities. Alternatively, the UHMW Silicone Polymer may be reactive, comprising functionalities, for example, hydroxy ends. The UHMW Silicone Polymer will have a viscosity in the range of about 10 million to about 50 million centistokes. It may preferably be used in the form of a masterbatch in a polyolefin carrier resin, typically about 25 to about 50 weight % UHMW Silicone Polymer in a suitable polyolefin carrier resin such as LDPE or PP. Alternatively, the UHMW Silicone Polymer may be made "in situ" by crosslinking vinyl silane with Polysiloxane.

"Tie Layer" means an extrudable adhesive layer well known in the art selected for its capability to bond a core layer to outer layers. Examples of such adhesive, tie layer polymer are based on either polyethylene or ethylene vinyl acetate copolymers. Ethylene-based and propylene-based homopolymers and copolymers, modified to enhance adhesion, are marketed by E. I. du Pont de Nemours and Company under the tradename, BYNEL®. They are typically modified with carboxyl groups such as anhydride.

The term "substantially uniform in thickness" means that the silicone containing film layer has uniform or substantially uniform thickness across the surface area of the film. It also means that the thickness variation is not more than plus or minus 10% and preferably is not more than plus or minus 5% across a given unit surface area.

The term "reduced migration of silicone" means that a silicone containing reagent or agent capable of migrating to an adhesive layer in contact therewith occurs to a lesser degree so that the adhesive layer which is contacted with a release film of the invention retains its adhesive properties without a diminishment in such properties because of the migration of silicone present in an adjacent layer.

The term "functionalized polyolefin" means that the polymer or copolymer is capable of directly reacting with a dimethylpolysiloxane having functional end groups to form a polymer chain with a dimethylpolysiloxane directly bonded thereto without an intervening vinyl silane moiety. The reaction can occur at a functional group on the polymer chain such as a carboxyl group on an ethylene acrylic acid or methacrylic acid copolymer or onto the silicone moiety on an ethylene vinyl silane copolymer.

The silicone-containing resin or film made therefrom of the present invention comprises
1. polyolefin homopolymer or copolymer of unsaturated hydrocarbons having 2–20 carbon atoms, particularly homopolymers of ethylene or propylene or copolymers of ethylene with alpha-olefin hydrocarbons having 3–10 carbon atoms, especially butene-1 and octene-1,
2. dimethyl polysiloxane having functional end groups, preferably a hydroxyl end group, the polysiloxane preferably being of the formula,

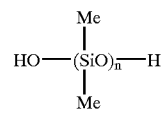

where Me =methyl and n is the range of 200 to 2,300,
3. vinyl silane compound, preferably one selected from the group consisting of vinyl trimethoxy silane, vinyl triethoxy silane, vinyl triacetoxy silane, trisbutanoxime vinyl silane, divinyl tetramethoxy disiloxane, and hexamethyl bisdimethylaminoxy cyclotetrasiloxane and mixtures thereof, and
4. ultra-high molecularweight silicone polymer having a number average molecular weight range from about 350,000 to about 1 million, preferably having a viscosity in the range of about 10 million to about 50 million centistokes, plus optionally
5. organic peroxide grafting agent, preferably one selected from the group consisting of di-tertiary alkyl peroxides, especially dicumyl peroxide and 2,5-dimethyl-2,5-di(t-butylperoxy) hexane; acetylenic diperoxy compounds, especially 2,5-dimethyl-2,5-di(t-butylperoxy) hexyne-3; peroxyesters, especially t-amyl peroxypivalate and t-butyl peroxyprivalate; peroxydicarbonates, especially di(sec-butyl) peroxydicarbonate; and acylperoxides, especially dibenzoyl peroxide to graft a portion of the vinyl silane onto the polyolefin, and
6. organo-metallic moisture curing agent, preferably an organo-tin compound, more preferably dibutyl tin dilaurate, or an organo-titanium compound.

Preferably, the silicone-containing resin or film made therefrom comprises, based on total weight of polymer components,
1. about 85 to about 98.89% (preferably about 91.0 to about 95.9%) polyolefin homo or copolymer,
2. about 1 to about 10% (preferably about 3 to about 7%) dimethyl polysiloxane having functional end groups,
3. about 0.01 to about 1.0% (preferably about 0.01 to about 0.5%) vinyl silane compound, and 4. about 0.1 to about 5% (preferably about 0.25 to about 3%) ultra-high molecular weight silicone polymer, plus
5. about 1 to about 100 parts per million (preferably about 5 to about 75 parts per million), based on weight of total polymer, of organic peroxide grafting agent, and
6. about 1 to about 100 parts per million (preferably about 3 to about 50 parts per million), based on weight of total polymer, of organo-metallic moisture curing agent.

Preferably, the amount of organic peroxide is sufficiently low that not all of the vinyl silane compound grafts to the polyolefin under grafting conditions. Expressed in an alternative way, conditions (i.e. process parameters and feed rates) are chosen such that only a portion of the vinyl silane is grafted to the polyolefin leaving some free vinyl silane after grafting.

Polyolefins used preferably are copolymers of ethylene with a hydrocarbon alpha-olefin having from 4–8 carbon atoms and having a density in the range of about 0.850 to about 0.970 grams per cubic centimeter ($g/cm^3$) and especially in the range of 0.920 to 0.930 $g/cm^3$. Preferably, the polymers have a melt index (MI) in the range of 0.05 to 120 dg/min, especially 0.1 to 75 dg/min and in particular in the range of 1 to 10 dg/min. (as measured per ASTM D-1238, condition E).

The present invention is a multi-layer structure which comprises a subweb as layer (A) and the silicone-containing polyolefin film or this invention as layer (B) placed on the subweb. Layer (A) will typically have a thickness of about 10 to about 100 microns (micrometers), preferably from about 15 to about 25 microns. Layer (B) will typically have a thickness of about 1 to about 10 microns, preferably from about 2 to about 6 microns. Particularly, if it is desired to prevent migration of silicone through layer (A), layer (B) preferably should have lower thickness, say about 1 to about 3 microns.

Layer (A), the subweb, may be any subweb known in the art suitable for coating or being laminated to the silicone-containing polymer of layer (B). In particular, the subweb may be paper particularly kraft paper, non-wovens, metal foil such as steel or aluminum, plastics such as nylon and polyesters particularly polyethylene terephthalate, or other subwebs suitable for coating. Preferably, the subweb is a Polyolefin, particularly the same Polyolefin used in the film of layer (B). The multi-layer film wherein the subweb is Polyolefin can be used in liquid-absorbing products, such as feminine hygiene pads, baby diapers and incontinence products. The release film of the invention may further be contacted with a first layer having an adhesive layer thereon to form a multilayer structure comprising a first layer of olefinic or non-olefinic material; an adhesive layer thereon; and a release film layer having the silicone containing compositions of the invention. The ultra-high molecular weight silicone reagent actually assists in preventing the migration of silicone to the surface and onto the adhesive and provides a method of retaining adhesive strength and properties for a release film which contacts a pressure sensitive adhesive. The olefinic or non-olefinic materials can be selected from, for example, those materials described above for the subweb and can also include biaxial polyester or polypropylene. Pressure sensitive adhesives are selected from those normally found on, for example, sticky tape and the like.

The silicone-containing polyolefin film of this invention preferably is surface treated, preferably by a corona discharge. The corona discharge is applied after formation of the film, preferably shortly after formation of the film, e.g., prior to the film being wound up, and prior to the film being subjected to significant amounts of moisture. In preferred embodiments, the corona discharge is formed between two elongated electrodes, using techniques that are known to those skilled in the art, at a sufficient level to improve the release properties of the film. The film is passed between the electrodes while the corona discharge is formed between the electrodes. Subjecting the silicone-containing polyolefin film to a corona discharge results in a release film having superior release characteristics compared with film that has not been so treated. The film may conveniently be treated at the speeds at which film is extruded from an extruder in the manufacture thereof. Other techniques for chemically activating the surface of the film, such as flame treatment and plasma discharge, may be used in place of corona discharge. Such techniques and the associated equipment are known to those skilled in the art.

The corona-discharge treated films of the present invention may be used in a variety of end-uses. For example, the film may be in the form of a film that is peelable from another substrate. Such films usually require that the layer of adhesive material be readily removed from the release film and then the layer be adhered to another substrate. In addition, multi-layer films wherein layer (A) is a Polyolefin may be perforated using known techniques and employed in the aforementioned feminine hygiene pads, baby diapers and incontinence products.

Processes for the manufacture of films of the type described above are known, including blowing, casting and extruding. Optionally, films can be monaxially or biaxially oriented using methods known in the art to improve properties and reduce thickness. Multi-layer films preferably are made by coextrusion of layer (A) and layer (B). In such coextrusions, using polyolefin as an example of layer (A), this first polyolefin is fed to one extruder to form layer (A), and a second polyolefin, dimethyl polysiloxane, vinyl silane compound, ultra-high molecular weight silicone polymer, organic peroxide grafting agent and organo-metallic moisture curing agent is fed in a suitable manner to a second extruder to form layer (B). The second extruder should be capable of forming a uniform mixture of such components and of extruding a uniform mixture in the form of a molten web so as to form a uniform film, which may be in the form of a sheet or a coating on layer (A). The process should be operated in the absence of excessive moisture prior to the extrusion of the composition from the extruder, to reduce premature cross-linking reactions of the vinyl silane.

In circumstances where the silicone-containing polyolefin will not effectively adhere to the substrate desired for layer (A), layer (B) may be coextruded with a tie layer between layer (A) and layer (B).

The components that form the layer (B) may be fed to the extruder in a number of ways. For instance, all components may be fed to the hopper of the extruder, using suitable carrier materials where appropriate, as is described in greater detail below. In alternative procedures, some of the components may be fed through the hopper of the extruder and the remainder fed directly into the extruder. For example, the polyolefin may be fed to the hopper and heated in the extruder until in a molten condition. Subsequently, the remaining ingredients may be introduced into the extruder by means of suitable feed ports on the extruder. For instance, the remaining ingredients may be fed into a cavity transfer mixer located in the extruder after the barrel of the extruder containing the extruder screw and prior to the extrusion die or other orifice through which the polymer is extruded. Cavity transfer mixers are known and are used for admixing of two or more materials in an extruder immediately prior to extrusion. Alternatively, the remaining ingredients may be introduced into the extruder through a gear pump, which is also known for the introduction of ingredients into an extruder. As a further example, a composition of polyolefin, dimethyl polysiloxane, and vinyl silane compound, plus organic peroxide grafting agent and organo-metallic moisture curing agent if used, may be melt-blended as one component in a twin-screw extruder, and allowed to age (cure) for a sufficient time prior to pellet (dry blending) or melt blending with a melt-blended composition of polyolefin and dimethyl polysiloxane, as well as with the ultra-high molecular weight silicone polymer, all of which in combination form the composition of layer (B) to be extruded. This final composition for layer (B) can be extruded using a single-screw extruder.

In addition, the aforementioned composition for forming layer (B) may be blended with any polyolefin compatible with polyolefin used to make layer (B), for example low density polyethylene (LDPE), without adversely effecting the properties of the resulting film. Such blending can range from 0.1 parts to 1.5 parts LDPE to 1 part layer (B) composition. Other additives as defined above may also be added.

A suitable procedure for extruding a film according to the present invention is as follows: a first polyolefin is fed to a first extruder; and simultaneously, a second modified polyolefin is fed to a second extruder through the hopper of the extruder. The modified polyolefin in the second extruder is preferably a blend of two or more compositions, which in combination form the composition to be extruded, and is heated in the extruder to form molten polymer. Thus, for the modified polyolefin in the second extruder, a composition of polyolefin, dimethyl polysiloxane, and vinyl silane compound, plus organic peroxide grafting agent and organo-metallic moisture curing agent if used, may be melt-blended as one component in a twin-screw extruder and allowed to cure for a sufficient amount of time prior to dry blending or melt blending with a composition of polyolefin and dimethyl polysiloxane, as well as with the ultra-high molecular weight silicone polymer. This final blend can be extruded into film using a single-screw extruder. It is important that the introduction of the components of the composition and the mixing capabilities of the apparatus being used be such that a uniform mixture be formed in the extruder and extruded therefrom.

If the components are fed in part directly into the extruder, e.g., using a cavity transfer mixer, then higher levels of, for example, dimethyl polysiloxane may be used at levels up to about 15%, which may be advantageous to the properties of the product that is obtained.

It will be appreciated by one of skill in the art that in the event that the polyolefin used to form layer (B) is a polyolefin/vinyl silane copolymer, the admixture of additional vinyl silane compound is not required. The process for preparing layer (B) in this case would include the combination of components in an extruder in any of the ways described in detail above, with the exception that no vinyl silane compound would be fed to the extrude. It should be noted in this regard that the addition of too much vinyl silane can lead to excessive cross-linking of the copolymer, which may adversely affect the formation of thin films in accordance with the present invention. Accordingly, the total amount of vinyl silane used in the preparation of layer (B), i.e. the amount added via vinyl silane copolymer and the amount added via vinyl silane monomer, should not be excessive. In particular, this amount should not exceed an amount of about 2% by weight, and preferably, an amount of about 1% by weight of the total weight of the polymer formulation.

EXAMPLES

The invention is illustrated through the following examples, wherein:

Component A is polydimethyl siloxane, silanol terminated, 1000 centistokes (cSt) p1 Component B is SILFINS® 6, a proprietary mixture of vinyl trimethoxy silane, organic peroxide and organic tin curing accelerator. SILFIN® 6 is made by Hüls.

Component C is vinyl triethoxy silane.

Component D is UHMW Silicone Polymer with a viscosity in the range of 10 to 50 million centistokes as a 25 % masterbatch in LDPE.

EXAMPLE 1-COMPARATIVE

A two-layer film was made by a blown-film process using a 200 mm diameter die and a blow-up ratio of 2.1:1 and a film line speed of about 14 meters/minute. Employing two 50 mm extruders, layer (A), a 23 micron thick film of a 5 MI LDPE, was extruded at 180–190° C. at an extruder RPM of 40, and layer (B), a 5 micron film formed from a dry pellet blend of 50% 5 MI LDPE+50% (10 MI LLDPE+6 % component A+160 ppm component B and 240 ppm component C) by melt-blending in the extruder, was extruded at 160–170° C. at an extruder RPM of 8. The film was corona treated on the layer (B) side.

The resulting film had film thickness variations of +/−15%. Surface tension on the 5 micron side of the film was 25 dynes/cm, but silicone was found to have also migrated through layer (A) of the film to the opposite side. The film was tested using a modified TAPPI UM502 test wherein the film (surface of layer (B) was placed on the adhesive tape of a commercial sanitary napkin and heat-aged for 20 hours at 70° C. The film release force from the adhesive was about 50 grams/inch. The adhesive release force from a stainless steel plate (after the film was peeled off the adhesive tape) was 50–60 grams/inch. Silicon was found to have migrated from the film surface into the adhesive.

EXAMPLE 2

A two-layer blown film construction was made on the same equipment and under the same conditions as Example 1, Layer (A) was a 23 micron film of a 5 MI LDPE. Layer (B) was a 2 micron film formed from a blend of: 70% (10 MI LLDPE+6 % component A+160 ppm component B+240 ppm component C), 25 % 5 MI LDPE, and 5 % component D. The film was corona treated on layer (B) side at the same level of discharge as in Example 1. This film extruded stably. The resulting film thickness variations were +/−5%. Surface tension on the 2 micron side was found to be 25 dynes/cm. No silicone was found to have migrated through layer (A) of the film. Using the same adhesive test as in Example 1, the film release force from the adhesive was about the same as in Example 1 (50 grams/inch). The release force of the adhesive from the stainless steel plate (after the film was peeled off the adhesive tape), however, was about 150–200 grams/inch. indicating significant reduction of silicone migration into the adhesive.

The invention is further illustrated through the following examples, wherein:

Component A is a silicone oil (siloxane) having hydroxy (-OH)functional end groups with a viscosity greater than 1000 centistokes (cSt)

Component D is a UHMW Silicone Polymer with a viscosity in the range of 10 to 50 million centistokes as a 25 % masterbatch in LDPE.

EXAMPLE 3-COMPARATIVE

A two-layer film was made by a cast film process using a 203 mm slit die, a chrome chill roll set at 60=BAC, and a film line speed of about 7 meters/minute. A 32 mm extruder was employed for layer (A), a 25 micron thick film of a dry pellet blend of a 5 MI LLDPE containing 10 % wt. of a white pigment masterbatch, which was melt-blended in the extruder at a temperature of 240=BAC at an extruder RPM of 18. A 16 mm extruder was employed for layer (B), a nominal 6.4 micron thick film formed from a dry pellet blend of 65 % wt. ethylene/trimethoxyvinylsilane copolymer with 2 wt. % vinyl silane in the copolymer based upon a low density polyethylene (and blended with a compatible polyethylene)+3 % wt. component A purchased from Optatech, and 35 % wt. of a 5 MI LLDPE (total percentage of vinyl silane in the 65/35 blend is 0.65 wt. %), by melt-blending in the extruder, was extruded at 240=BAC at an extruder RPM of 32. The film was corona treated on the layer (B) side at a level different from examples 1 and 2. The resulting film had a film thickness variation of from 14 % to 6 %. Using the same adhesive test as in Example 1, the film release force from the adhesive was about 110 g/in. The release force of the adhesive from the stainless steel plate (after the film was peeled off the adhesive) was about 694 grams/inch.

EXAMPLE 4

A two-layer blown film construction was made on the same equipment and under the same conditions as in Example 3. Layer (A) was a 25 micron film made from a dry pellet blend of 5 MI LLDPE containing 10 % wt. of a white pigment masterbatch. Layer (B) was a nominal 2.5 micron thick film formed from a dry pellet blend of 58 wt % ethylene/trimethoxyvinylsilane copolymer with 2 wt. % vinyl silane in the copolymer (same as above in example 3)+3% wt. component A purchased from Optatech, 32 % wt. of a 5 MI LLDPE, and 10 % wt. Component D, by melt-blending in the extruder. The film was corona treated on the layer (B) side at the same level of discharge as in Example 3.

In addition to the examples shown above, other functionalized or unfunctionalized blends of the invention may readily be prepared by substituting the particular copolymers or polymers identified above with other suitable direct copolymers or grafted polymers described herein and either use free radical mechanisms and reagents (peroxides) to graft vinyl silane to the polymer backbone with subsequent reaction by OH-PDMS or other polysiloxane having functional end groups which react with the vinyl silane grafted onto the backbone to form the resins of the invention which require vinyl silane grafted onto the backbone. Or, suitable functionalized polymers or copolymers described herein can be utilized to directly react with a polysiloxane having functional end groups which covalently react with a functional group on or attached to the backbone of the base polymer to form compounds which do not have a vinyl silane moiety covalently attached on both the backbone of the polymer and on the polysiloxane group. In both cases, the UHMW silicone resins are added to the polymer(s) to form a resin blend which is utilized as a release layer or release film or in multilayer structures as described above. For example, the resins and films described in EP 0484093 B1 may additionally contain UHMW silicone.

What is claimed is:

1. A silicone-containing resin comprising:
    a) a polyolefin selected from (i) an unfunctionalized polyolefin homopolymer or copolymer of unsaturated hydrocarbons having 2–20 carbon atoms or mixtures thereof or from (ii) a functionalized polyolefin selected from a direct copolymer of ethylene and a polar monomer or from (iii) an ionomeric copolymer or blends thereof or from (iv) a graft copolymer or blends of graft copolymers or mixture of (i), (ii), (iii) or (iv),
    b) a dimethyl polysiloxane having functional end-groups,
    c) a vinyl silane compound, and
    d) an ultra-high molecular weight silicone polymer having a number average molecular weight range from about 350,000 to 1 million
    wherein components b) and d) are different from each other.

2. The resin of claim 1 further comprising:
    e) organic peroxide grafting agent to graft a portion of the vinyl silane onto the polyolefin; and
    f) organo-metallic moisture curing agent.

3. The resin of claim 1 or 2 wherein the polyolefin is a homopolymer of ethylene or propylene or copolymer of ethylene with alpha-olefin hydrocarbons having 3–10 carbon atoms or mixture thereof.

4. The resin of claim 3 wherein the polyolefin is a copolymer of ethylene with a hydrocarbon alpha-olefin having from 4–8 carbon atoms and a density of about 0.850 to about 0.970 grams per cubic centimeter (g/cm$^3$).

5. The resin of claim 4 wherein the polyolefin has a density of 0.920 to 0.930 g/cm$^3$.

6. The resin of claim 2 wherein the polyolefin has a melt index (MI) of 0.05 to 120 dg/min (as measured per ASTM D-1238, condition E).

7. The resin of claim 6 wherein the polyolefin has an MI of 1 to 10 dg/min.

8. The resin of claim 2 wherein:
    the polysiloxane has the formula,

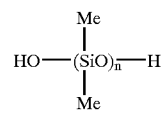

where Me=methyl and n is the range of 200 to 2,300,
    the vinyl silane is one selected from the group consisting of vinyl trimethoxy silane, vinyl triethoxy silane, vinyl triacetoxy silane, trisbutanoxime vinyl silane, divinyl tetramethoxy disiloxane, and hexamethyl bisdimethylaminoxy cyclotetrasiloxane and mixtures thereof,
    the ultra-high molecular weight silicone polymer has a viscosity in the range of about 10 million to about 50 million centistokes,
    the organic peroxide is selected from the group consisting of ditertiary alkyl peroxides, peroxyesters, peroxydicarbonates, acylperoxides, and acetylenic diperoxy compounds, and
    the moisture curing agent is an organo-tin or organo-titanium compound.

9. The resin of claim 2 comprising, based on total weight of polymer components:
    a) about 85 to about 98.89% polyolefin homo or copolymer,
    b) about 1 to about 10% dimethyl polysiloxane having functional end groups,
    c) about 0.01 to about 1.0% vinyl silane compound, and
    d) about 0.1 to about 5% ultra-high molecular weight silicone polymer, plus e) about 1 to about 100 parts per million of organic peroxide grafting agent, and f) about 1 to about 100 parts per million of organo-metallic moisture curing agent.

10. The resin of claim 9 comprising, based on total weight of polymer components:

a) about 91.0 to about 95.9 % polyolefin homo or copolymer, b) about 3 to about 7 % dimethyl polysiloxane having functional end groups, c) about 0.01 to about 0.5 % vinyl silane compound, and d) about 0.25 to about 3 % ultra-high molecular weight silicone polymer, plus e) about 5 to about 75 parts per million of organic peroxide grafting agent, and f) about 3 to about 50 parts per million of organo-metallic moisture curing agent.

11. The resin of claim 8 wherein the vinyl silane is present in an amount sufficient that only a portion of the vinyl silane is grafted to the polyolefin leaving some free vinyl silane after grafting.

12. A silicone-containing film comprising the resin of claim 1 or 2.

13. The film of claim 12 wherein the film is surface treated.

14. The film of claim 13 wherein the film is surface treated by corona discharge.

15. A multi-layer structure comprising layer (A) a subweb, and layer (B) the silicone-containing film of claim 12 wherein layer (B) is substantially uniform in thickness.

16. The multi-layer structure of claim 15 wherein layer (A) has a thickness of about 10 to about 100 microns (micrometers), and layer (B) has a thickness of about 1 to about 10 microns.

17. The multi-layer structure of claim 16 wherein layer (A) has a thickness of about 15 to about 25 microns, and layer (B) has a thickness of about 2 to about 6 microns.

18. The multi-layer structure of claim 17 wherein layer (A) has a thickness of about 15 to about 25 microns, and layer (B) has a thickness of about 2 to about 4 microns.

19. The multi-layer structure of claim 18 wherein the subweb is paper.

20. The multi-layer structure of claim 15 wherein the subweb is polyolefin homopolymer or copolymer of unsaturated hydrocarbons having 2–20 carbon atoms or mixtures thereof.

21. The multi-layer structure of claim 20 that has been perforated.

22. A composite structure comprising the multi-layer structure of claim 21 and, adjacent to layer (a), an absorbent material.

23. A resin formulation, consisting essentially of:

a) a functionalised polyolefin, b) a dimethyl polysiloxane having functional end-groups, c) an ultra-high molecular weight silicone polymer having a number average molecular weight range from about 350,000 to 1 million and wherein the functionalised polyolefin reacts with the dimethyl polysiloxane, and d) an organo-metallic moisture curing agent wherein components b) and c) are different from each other.

24. The formulation according to claim 23 wherein the functionalized polyolefin is selected from (i) a copolymer of blends of copolymers of ethylene directly copolymerized with a polar monomer selected from an alpha, beta-ethylenically unsaturated C3–C8 carboxylic acid or ester thereof or an ethylenically unsaturated ester of a carboxylic acid, (ii) an ionomeric copolymer where the ionomeric copolymer is derived from direct copolymers of ethylene and acid copolymers by neutralization of the acid groups with metal ions, (iii) a graft copolymer wherein the graft monomers are selected from the group consisting of ethylenically unsaturated acid and their derivatives, or from the group consisting of ethylenically unsaturated anhydrides and their derivatives, or from the group consisting of ethylenically unsaturated monomers containing amino or hydroxy functional groups, or (iv) a blend of one or more copolymers selected from (i), (ii), (iii) or from a polyolefin homopolymer or copolymer of unsaturated hydrocarbons having 2–20 carbon atoms or mixtures thereof.

25. The formulation according to claim 24 wherein the direct copolymer is selected from an ethylene vinyl silane copolymer.

26. The formulation according to claim 23, comprising less than about 2% by weight of vinyl silane in the copolymer.

27. The formulation according to claim 23 comprising, based on total weight of polymer components:

a) about 85 to about 98.89% polyolefin/vinyl silane copolymer;

b) about 1 to about 10% dimethyl polysiloxane having functional end groups;

c) about 0.1 to about 5% ultra-high molecular weight silicone polymer; and d) about 1 to about 100 parts per million of organo-metallic moisture curing agent.

28. A silicone-containing film comprising the resin of claim 23.

29. A multi-layer structure comprising:

layer (A) in the form of a subweb having a thickness of about 10 to about 100 microns, and layer (B) in the form of the silicone-containing polyolefin film of claim 28 having a thickness of about 1 to about 10 microns.

30. A multi-layer structure comprising a first layer selected from a polymeric layer or a non-polymeric layer;

a pressure sensitive adhesive layer; and a release film silicone containing layer having the composition according to claims 1, 2, 23 or 24 wherein reduced migration of silicone occurs into the pressure sensitive adhesive layer.

* * * * *